(12) United States Patent
Mayr et al.

(10) Patent No.: US 8,845,475 B2
(45) Date of Patent: Sep. 30, 2014

(54) CONNECTING ASSEMBLY AND METHOD OF PRODUCING A CONNECTING ASSEMBLY

(75) Inventors: Nikolaus Mayr, Bruneck (IT); Ernst Mairhofer, Sand in Taufers (IT); Oliver Roth, Lindlar (DE); Kurt Müller, Merzenich (DE); Jürgen Wörner, Lohmar (DE)

(73) Assignee: GKN Driveline International GmbH, Lohmar (DE)

( * ) Notice: Subject to any disclaimer, the term of this patent is extended or adjusted under 35 U.S.C. 154(b) by 216 days.

(21) Appl. No.: 13/512,846

(22) PCT Filed: Nov. 23, 2010

(86) PCT No.: PCT/EP2010/068026
§ 371 (c)(1),
(2), (4) Date: Jun. 22, 2012

(87) PCT Pub. No.: WO2011/064206
PCT Pub. Date: Jun. 3, 2011

(65) Prior Publication Data
US 2012/0264559 A1   Oct. 18, 2012

(30) Foreign Application Priority Data
Nov. 30, 2009 (DE) .......................... 10 2009 056 087

(51) Int. Cl.
| F16H 48/24 | (2006.01) |
|---|---|
| F16H 57/02 | (2012.01) |
| F16H 48/30 | (2012.01) |
| F16H 57/038 | (2012.01) |
| F16H 57/037 | (2012.01) |
| F16H 48/08 | (2006.01) |
| F16H 48/40 | (2012.01) |
| F16H 48/34 | (2012.01) |
| F16H 48/38 | (2012.01) |

(52) U.S. Cl.
CPC .............. *F16H 48/30* (2013.01); *F16H 57/038* (2013.01); *F16H 57/037* (2013.01); *F16H 48/08* (2013.01); *F16H 48/24* (2013.01); *F16H 48/40* (2013.01); *F16H 2048/343* (2013.01); *F16H 2048/382* (2013.01); *F16H 2048/385* (2013.01)
USPC ......................... 475/220; 74/606 R (58) Field of Classification Search
USPC .................. 475/230, 231, 235; 74/606 R
See application file for complete search history.

(56) References Cited

U.S. PATENT DOCUMENTS 2,234,592 A * 3/1941 Fitzner ........................... 475/235
4,125,026 A * 11/1978 Torii et al. ..................... 475/230

(Continued)

FOREIGN PATENT DOCUMENTS

DE    10 2007 004 709 A1    8/2008

OTHER PUBLICATIONS

PCT International Search Report for PCT/EP2010/068026 dated Mar. 4, 2011.

*Primary Examiner* — Jacob S Scott
(74) *Attorney, Agent, or Firm* — Bejin VanOphem and Bieneman PLC (57) ABSTRACT

The disclosure relates to a connecting assembly, more particularly for being used in the driveline of a motor vehicle. The connecting assembly comprises a housing and a driving gear. The housing comprises a first housing part with a first flange portion and a second housing part with a second flange portion. The driving gear comprises a receiving portion for receiving the housing and a supporting face which laterally delimits the receiving portion, wherein the first flange portion of the first housing part is axially arranged between the supporting face of the driving gear and the second flange portion of the second housing part, and wherein the second flange portion is welded to the driving gear. A method of producing a connecting assembly is also disclosed.

12 Claims, 5 Drawing Sheets

(56) References Cited

U.S. PATENT DOCUMENTS

| | | |
|---|---|---|
| 5,533,423 A | 7/1996 | Stehle et al. |
| 5,591,098 A | 1/1997 | Jones et al. |
| 5,890,989 A | 4/1999 | Yamazaki et al. |
| 6,945,898 B2 * | 9/2005 | Szuba .......................... 475/230 |
| 7,325,664 B2 * | 2/2008 | Fusegi ......................... 475/231 |
| 8,444,522 B2 * | 5/2013 | Cripsey et al. ............... 475/230 |
| 2009/0266198 A1 | 10/2009 | Nosakowski |

* cited by examiner

CONNECTING ASSEMBLY AND METHOD OF PRODUCING A CONNECTING ASSEMBLY

CROSS REFERENCE TO RELATED APPLICATIONS

This application is a National Phase of International Application No. PCT/EP2010/068026, filed on Nov. 23, 2010, which claims priority to German Application No. 10 2009 056 087.4, filed on Nov. 30, 2009, which applications are hereby incorporated by reference in their entirety.

TECHNICAL FIELD

The disclosure relates to a connecting assembly, more particularly for a connecting assembly being used in the driveline of a motor vehicle, and to a method of producing such a connecting assembly.

BACKGROUND

Connecting assemblies are known. For example, connecting assemblies can comprise a differential which comprises one input part and two output parts which are drivingly connected to the input part and which, relative to one another, have a differential effect. In this way, there are achieved different speeds for the output parts, for example when the vehicle negotiates curves. There are also known connecting assemblies which comprise a coupling, for instance for optionally driving a secondary driving axle in the driveline of a motor vehicle driven by a plurality of axles.

From DE 10 2007 004 709 A1 there is known a spur-gear differential. The spur-gear differential comprises an annular drive gear which is fixed to a housing. The housing comprises two housing parts which are fixed to the annular drive by means of a bolted connection.

From US 2009/0266198 A1 there is known a differential casing assembly having first and second casing halves welded to each other to mount and secure an annular ring.

From DE 197 16 386 C2 there is known a differential apparatus for a part-time four-wheel drive vehicle. The differential apparatus includes an outer differential casing, an inner differential casing, a clutch member adjacent to the inner differential casing, a pair of dog clutches, a differential gear system arranged in the inner differential casing and an actuator body for actuating the clutch member. One of the dog clutches is connected with the inner differential casing, while the other of the dog clutches is formed on the clutch member.

From DE 10 2004 034 736 A1 there is known a differential for a motor vehicle axle. The differential comprises a differential carrier and a differential cover which are connected to a crown wheel. The differential carrier is connected to the differential cover and to the crown wheel via a radial weld. For this purpose, the differential carrier, at its circumference in the flange region of the crown wheel support, comprises recesses which are engaged by segments of the differential cover. In this way, the differential carrier and the differential cover come into contact with the crown wheel, and the three parts can be connected with only one radial weld.

SUMMARY

A connecting assembly is disclosed herein, more particularly for use in the driveline of a motor vehicle which permits a simple and cost-effective production and assembly procedure. Furthermore, a suitable method of producing such a connecting assembly is also disclosed.

More specifically, a connecting assembly is disclosed, such as that used in the driveline of a motor vehicle, comprising a housing and a driving gear. The housing comprises a first housing part with a first flange portion and a second housing part with a second flange portion. The driving gear comprises at least one receiving portion for receiving the housing and a supporting face which laterally delimits the receiving portion. The first flange portion of the first housing part is axially arranged between the supporting face of the driving gear and the second flange portion of the second housing part. The second flange portion is welded to the driving gear. According to an embodiment of the disclosure, of the group comprising the first and second flange portion, only the second flange portion is welded to the driving gear. In other words, the first flange portion remains non-welded with regard to the connection with the driving gear, respectively with the second flange portion.

An advantage of this embodiment is that the production and assembly expenditure for producing the disclosed connecting assembly is particularly low. Only one single weld is necessary for firmly connecting three components to one another, i.e. the driving gear, the first housing part and the second housing part. This means that production can be carried out particularly quickly and cost-effectively. Furthermore, the connecting assembly is particularly light-weight because there is no need for additional connecting means such as bolts.

In one exemplary arrangement, the driving gear, more particularly, is a toothed gear, for instance in the form of a ring gear or crown gear. The toothed gear serves to introduce torque into the connecting assembly. Instead of the toothed gear, it is also possible to use a pulley or a chain disc for introducing torque. Within the framework of the disclosure, the connecting assembly is meant to be an assembly in the driveline of a motor vehicle, in which assembly three or more components are connected to one another, wherein torque can be transmitted directly from one of the components of the connecting assembly, i.e. the driving gear, to at least one further component of the connecting assembly, i.e. the second housing part. In one exemplary arrangement, the disclosed connecting assembly is a differential which divides torque transmitted via the driving gear and transmits same to two output parts. A further application could be a coupling which serves to connect, on demand, a secondary driving axle in the driveline of a motor vehicle driven by a plurality of axles.

According to an exemplary arrangement, both the first housing part, with its first flange portion as well as the second housing part with its second flange portion, are arranged in the receiving portion of the driving gear. This is advantageous in that only one face in the receiving portion has to be machined, which face forms a centering seat both for the first flange portion and for the second flange portion. In this way it is possible to achieve improved radial runout and axial runout conditions. However, it is also possible for the driving gear to comprise a first receiving portion for the first flange portion and a second receiving portion for the second flange portion, wherein the first and the second receiving portion and, respectively, the first and the second flange portion can have different diameters.

The inner face of the receiving portion and the outer faces of the first and of the second flange portion may be formed to be cylindrical, so that these components are easy to produce, for instance by a turning operation. The first and the second flanges may also have the same outer diameter. However, it is also conceivable for the first and the second flange portion and the respective receiving face to be conical in shape. In this way it is possible to generate high friction forces. In an inserted condition of the two flange portions, a side face of the second flange portion may be at least substantially flush with a side face of the driving gear. In other words, the side face of the second flange portion and the side face of the driving gear are at least substantially aligned in a radial plane. The advantage of this design is that the welding can take place in axial direction. Furthermore, deformation due to shrinkage after welding of the second flange portion and the driving gear is symmetrical. According to one exemplary embodiment, at least in a partial region of the radial overlap with the supporting face, the first flange portion extends over a shorter axial distance than the second flange portion.

It is proposed that only the second flange portion is welded to the driving gear, with a joining region between the driving ring and the second flange portion more particularly being designed such that the first flange portion is axially loaded by the shrinkage forces occurring while the weld is cooling. Shrinkage of the welded components occurring after the welding operation is used for generating an axial pretension in the first flange portion. According to one embodiment, it is proposed that at least between the first flange portion of the first housing part and the receiving portion of the driving gear, there is formed an interference fit which is also referred to as a press fit. According to an advantageous further embodiment, it is proposed that between the second flange portion of the second housing part and the receiving portion there is also formed such an interference fit. After the welding operation, the first flange portion is axially fixed between the supporting face of the driving gear and the second flange portion. The supporting face of the driving gear may be formed by an annular inner flange of the driving gear which extends radially inwardly from the inner face of the receiving portion. It is also contemplated that instead of the annular inner flange, it is also possible to provide a plurality of circumferentially distributed flange segments or driving segments which laterally delimit the receiving portion and thus form an axial stop.

Because of the interference fit, both the first and the second flange portion are positioned in the driving gear with a radial pretension, so that even in an unwelded condition, a certain torque would have to be applied for rotating the first and the second housing part relative to the driving gear. After the welding operation, due to the shrinkage forces occurring during the cooling process and the resulting axial pretension, the torque required for rotating the first housing part relative to the driving gear is clearly increased, more particularly by more than double its value. This embodiment is advantageous in that, after the welding operation, the pretensioning forces are so high that a relative rotation of the first housing part relative to the second housing part and the driving gear is avoided without there being the need to provide any additional anti-rotation means.

A particularly high axial pretension can be achieved if at least one of the components, either the driving gear or the second flange portion, and in one exemplary arrangement, both, comprise an annular lip with a certain geometry. Said annular lip is to be understood as a portion of the driving gear and of the second flange portion respectively, which comprises an axial extension component away from the respective component. In the condition in which the second flange portion is inserted into the receiving portion, the annular lips are at least partially in surface contact with one another. Between the annular lips, in the region of the lateral ends of the joining region, a V-groove for receiving welding wire can optionally be provided. The joining region which is formed between the annular lips and which is welded at a later stage is laterally delimited by an annular recess inside the driving gear and inside the second flange portion. More particularly, the inner recess is formed by a first annular groove in the cylindrical inner face of the receiving portion and an opposed second annular groove in the cylindrical outer face of the second flange portion.

According to one exemplary arrangement, the driving gear and/or the second housing part, in a side face, comprise/comprises an annular recess which is arranged at a radial distance from the joining region. The annular lateral recess extends in axial direction at least along half the axial length of the annular lip, more particularly at least as far as the annular groove. The annular recess extends conically towards the annular lip, with the respective lip being tapered in the axial direction towards the side wall. Overall, this embodiment ensures a particularly high axial pretension of the first flange portion, so that the first housing part is prevented from rotating relative to the driving gear and the second housing gear, respectively.

According to an alternative or additional embodiment, it is proposed that to ensure reliable fixing, there is provided an anti-rotation mechanism which is effective at least indirectly between the first housing part and the driving gear. "At least indirectly" in this context means that the anti-rotation mechanism can be formed directly between the first housing part and the driving gear, or indirectly in that the anti-rotation mechanism is effectively arranged between the first housing part and the second housing part. For instance, the anti-rotation mechanism can be provided in the form of one or several projections which are formed on to one of the two components and which engage corresponding recesses in the other one of the two components. In this way, the first housing part is reliably prevented from rotating relative to the driving gear and second housing part. The anti-rotation mechanism can also be provided in the form of pins, knobs or an additional segment weld. The use of other friction force increasing arrangements is also conceivable, such as roughened surfaces or micro-teeth between the pairs of surfaces contacting one another.

According to an exemplary embodiment, the housing contains a differential carrier and a coupling, with the differential carrier being supported so as to be rotatable in the housing. In the closed condition, the coupling transmits torque from the driving gear and the second housing part welded thereto to the differential carrier, and in an open condition, the transmission of torque between said components is interrupted. In connection with this embodiment, there exists a special advantage in that the weld ensures a secure connection between those components between which torque is transmitted, i.e. between the driving gear and the second housing part. On the other hand, no material-locking connection is produced between those components between which no torque is transmitted directly, i.e. between the driving gear and the first housing part. Therefore, in the connecting assembly according to the disclosure, the connection needed for torque transmitting purposes is limited to those components which actually directly participate in the transmission of torque.

In one exemplary arrangement, the coupling comprises a first coupling part which is firmly connected to the differential carrier, and in one particular arrangement, is produced so as to be integral with the differential carrier, and a second coupling part which is connected to the second housing part in a rotationally fixed way, with the second coupling part being held so as to be axially movable relative to the second housing part. Furthermore, there is provided a controllable actuator for actuating the coupling, which actuator, selectively, is able to load the second coupling part towards the first coupling part, so that the coupling is closed, or to disengage the second coupling part from the first coupling part, so that the coupling is open.

Furthermore, A method of producing a connecting assembly is also disclosed. The disclosed method includes the following connecting stages: producing a driving gear with at least one receiving portion and a lateral supporting face; inserting a first housing part into the receiving portion of the driving gear, wherein a first flange portion of the first housing part abuts against the lateral supporting face; positioning a second housing part on the first housing part; and welding the second housing part to the driving gear. Of the group comprising the first flange portion and the second flange portion, only the second flange portion is welded to the driving gear, whereas the first flange portion remains non-welded relative to the driving gear, respectively the second flange portion.

The disclosed method is advantageous in that producing and assembling the connecting assembly is particularly effective. There is a need for only one single weld by which two components, i.e. the driving gear and the second housing part, are connected in a material-locking way. The third component, i.e. the first housing part is axially fixed between the supporting face of the driving gear and the second housing part is axially clamped in due to shrinkage tensions. A separate weld is not required. The production method is thus particularly quick and cost-effective.

According to an exemplary arrangement, it is proposed that in addition to the first housing part, the second housing part, too, is inserted into the receiving portion of the driving gear, with a second flange portion of the second housing part being made to axially contact the first flange portion of the first housing part. The axial width of the first flange portion and that of the second flange portion are such that a side face of the second flange portion facing away from the first flange portion is at least approximately flush with a side face of the driving gear.

In an exemplary embodiment, at least an outer face of the first flange portion and an inner face of the receiving portion are produced in such a way that there is formed an interference fit between the first and the second flange portion. Prior to the welding operation, first the first housing part is pressed into the receiving portion of the driving gear. Preferably, the second flange portion of the second housing part also is inserted into the receiving portion after the first housing, and comprises an interference fit relative to the receiving portion.

With reference to the axis of rotation of the driving gear, the welding operation takes place in the axial direction between the inner face of the driving gear and the outer face of the second flange portion, more particularly by rotating the connecting assembly relative to the welding device and the welding beam. "Axial direction" in this context is meant to include certain deviations. The process of welding the second housing part to the driving gear may be affected by a high-energy beam, more particularly by a laser beam or an electron beam. Laser beam welding offers the advantage of a high process speed, and due to rapid cooling of the joined zone, there are generated relatively high shrinkage forces which, in turn, lead to a high axial pretension of the first flange portion. When pairing and welding together different materials such as steel and cast materials, it is possible, more particularly, to use a filler material for the weld, such as a nickel wire. This is not necessary when the same materials are paired, so that the driving gear and the second flange portion can be designed in such a way that, prior to being welded together, they are in direct surface contact.

According to an exemplary arrangement, the driving gear is produced so as to comprise a first annular lip and the second housing part is produced so as to comprise a second annular lip, with the first and the second annular lips being arranged so as to approach one another, when the second flange portion is inserted into the receiving portion. Furthermore, in one exemplary arrangement, a continuous recess is worked into the cylindrical inner face of the driving gear, which continuous recess laterally delimits the joining region to be welded. Preferably, a corresponding continuous recess is worked into the cylindrical outer face of the second flange portion, which continuous recess laterally delimits the contact faces to be welded. As a result of the welding process, the annular lips in the region between the outer side face and the inner recess are connected to one another in a material-locking way.

According to an exemplary arrangement, the driving gear may be produced from a case-hardening steel, for instance 20MnCr5 or a similar material. Case-hardening steel is characterised by a high degree of toughness and a high degree of hardness on the surface and thus, overall, comprises a high degree of resistance against wear. The first and the second housing part may be produced from a cast material, more particularly cast iron with spheroidal graphite, for instance EN-GJS-500 (GGG50) or EN-GJS-600 (GGG60).

BRIEF DESCRIPTION OF THE DRAWINGS

Exemplary embodiments will be explained below with reference to the drawings wherein.

DETAILED DESCRIPTION

Figure 1:
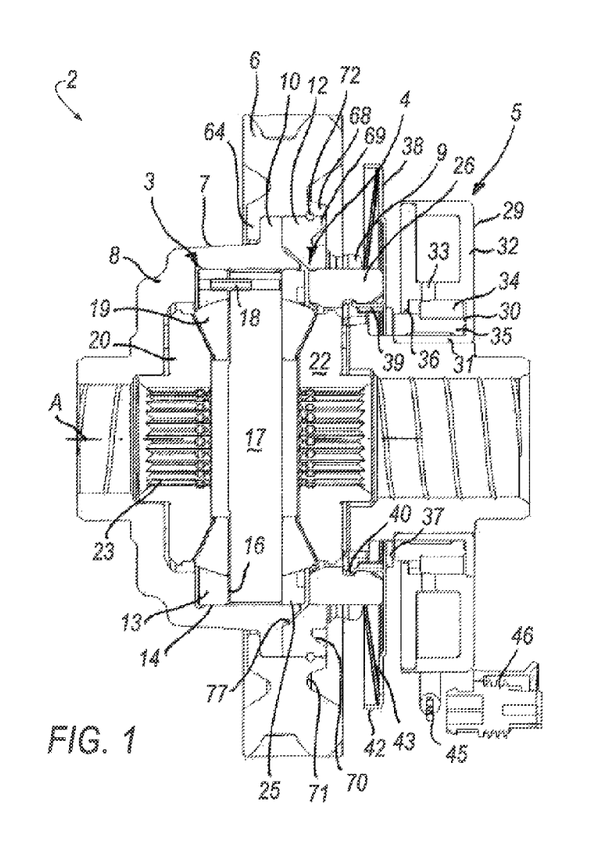
FIG. 1 is a longitudinal section of a connecting assembly with a coupling in a first embodiment, wherein the coupling is switched into the open position.
Figure 2:
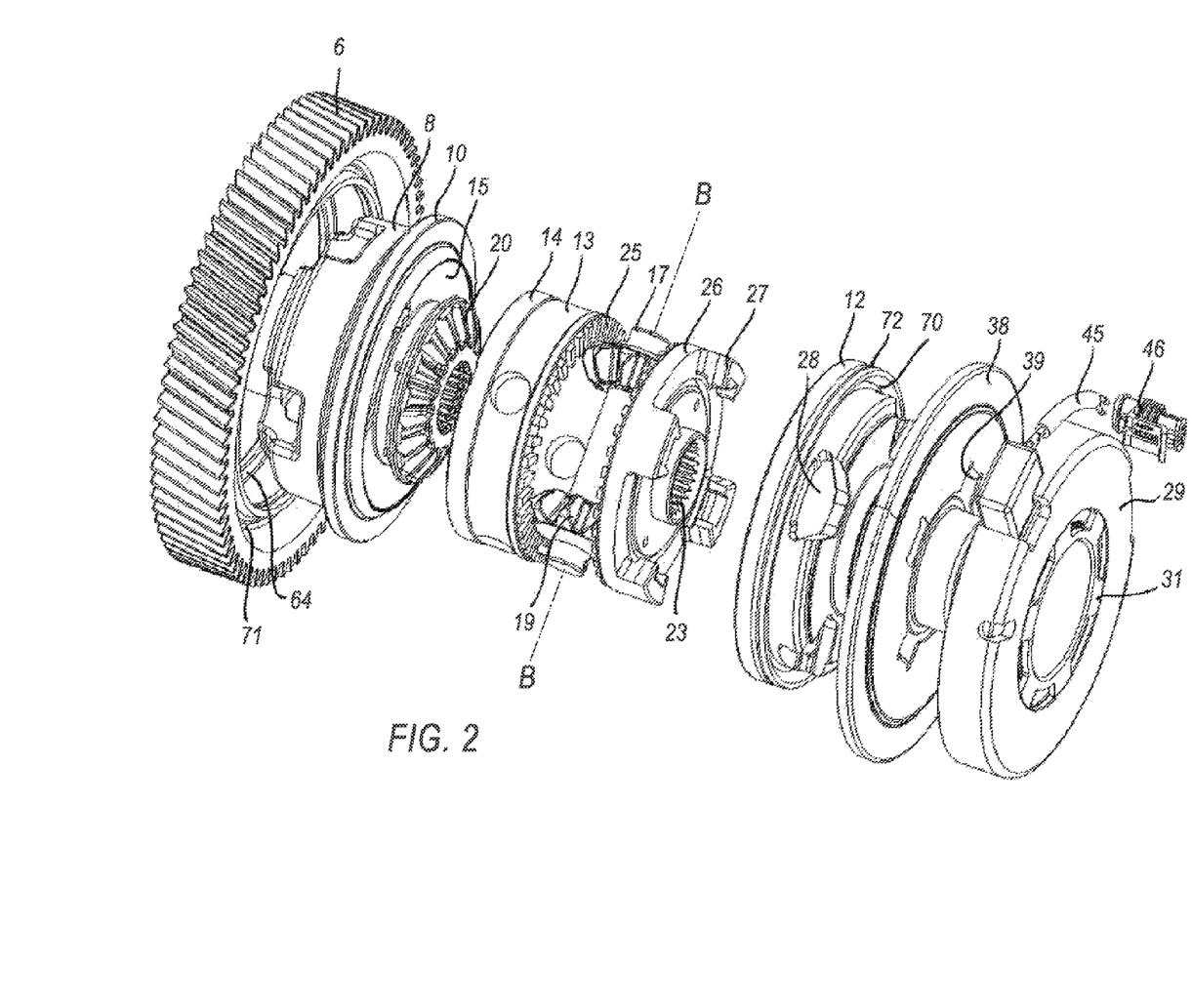
FIG. 2 is an exploded perspective view of the connecting assembly according to FIG. 1.
Figure 3:
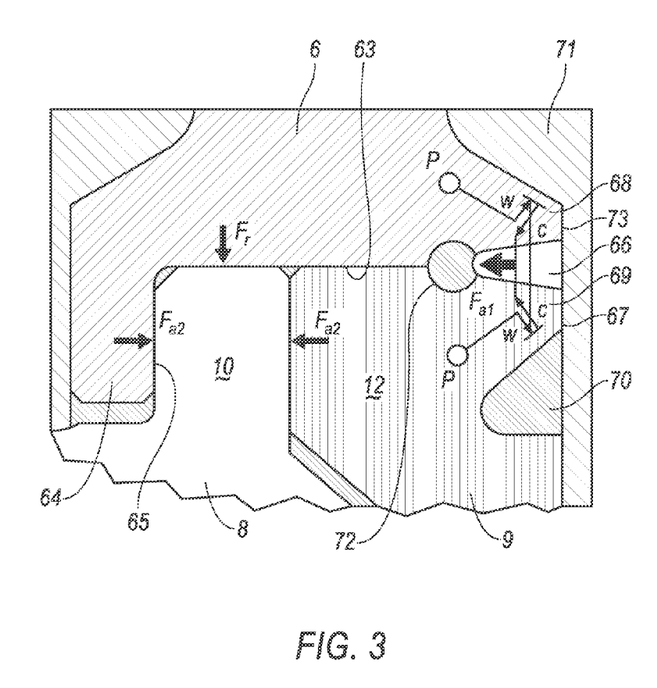
FIG. 3 is a longitudinal section in the form of a detail of the connecting region between the driving gear and the housing of the connecting assembly according to FIG. 1.

FIGS. 1 to 3 show a connecting assembly 2 in a first embodiment and will initially be described jointly below. There is shown a connecting assembly 2 which comprises a differential drive 3, a coupling 4 as well as an actuator 5 for actuating the coupling 4. For introducing torque from a driving motor (not illustrated), there is provided a driving gear 6 which, in a way described in greater detail below, is firmly connected to a housing 7. The housing 7 is produced in two parts and comprises a first cup-shaped housing part 8 and a second cup-shaped housing part 9 which, at their aperture ends, each comprise a flange portion 10, 12 by which they are connected to the driving gear 6. In the first housing part 8 there is arranged the differential drive 3 which can be rotatingly driven around an axis of rotation A.

The differential drive 3 comprises a differential carrier 13 which comprises a substantially cylindrical outer face 14 by which the differential carrier 13 is rotatably and slidably supported relative to a corresponding inner-cylindrical surface portion 15 of the first housing part 8. In the differential carrier 13 there are provided two bores 16 into which there is inserted a journal 17 which is fixed by a securing pin 18. Two differential gears 19 are supported on the journal 17 so as to be rotatable around a journal axis B. The teeth of the two differential gears 19 engage those of a first and a second sideshaft gears 20, 22 which are arranged coaxially relative to the axis of rotation A. The two sideshaft gears 20, 22 each comprise longitudinal teeth 23 into which it is possible, for torque transmitting purposes, to insert corresponding counter teeth of a sideshaft (not illustrated). The first sideshaft gear 20 is axially supported relative to the first housing part 8, and in one embodiment, a sliding disc is arranged between the first sideshaft gear 20 and the supporting face of the first housing part 8. Accordingly, for supporting the axial forces, there is also inserted a sliding disc between the second sideshaft gear 22 and the second housing part 9.

The coupling 4 is provided in the form of a form-locking coupling, more particularly a dog clutch or a toothed coupling. However, it is understood that other types of couplings can also be used, for instance a friction coupling. The form-locking coupling 4 comprises a first coupling part 25 which is firmly connected to the differential carrier 13, as well as a second coupling part 26 which is axially movable relative to the first coupling part 25. For the purpose of transmitting torque, the second coupling part 26 can be inserted into the first coupling part 25, thus producing a form-locking connection between the two coupling parts 25, 26. By disengaging the second coupling part 26, the transmission of torque can be interrupted. The first coupling part 25 comprises a form-locking mechanism. In one exemplary arrangement, the form-locking mechanism is in the form of a toothed ring that is integrally formed on to an end face of the differential carrier 13. Accordingly, in this arrangement, the second coupling part 26 comprises a corresponding toothed ring which is arranged inside the housing 7. Furthermore, the second coupling part 26 comprises a plurality of circumferentially distributed axial projections 27 which extend through corresponding through-apertures 28 in the housing 7. By controlling the actuator 5, the second coupling part 26 can be axially moved relative to the first coupling part 25, with a transmission of torque being ensured from the driving gear 6 to the differential drive 3 in the engaged condition, whereas the transmission of torque is interrupted in the disengaged condition.

The actuator 5 comprises an electromagnet 29 as well as a piston 30, with the actuator 5 being designed such that when current is supplied to the electromagnet 29, the piston 30 is loaded towards the coupling 4. For this purpose, the electromagnet 29 comprises an annular housing 32 which comprises an opening 33 at a radial inner end of the housing 32 facing the coupling 4. The piston 30 is axially movably arranged inside the housing portion. By means of a supporting element 31, the housing 32 is arranged on a sleeve portion of the second housing part 9. The piston 30 comprises an anchor element 34 comprising a ferromagnetic material, for example an iron material, as well as a sleeve 35 comprising a paramagnetic material such as stainless steel, copper or aluminium. The anchor element 34 is sleeve-shaped and pressed on to the sleeve 35. Because the anchor element 34 is produced from a ferromagnetic material, is it moved towards the coupling 4 when the electromagnet 29 is actuated, with the gap 33 being bridged in the process. In its end position, the anchor element 34 comes to rest against a shoulder 36 of the magnetic housing 32, thereby occurring a friction contact. The sleeve 35 is paramagnetic in order to prevent an undesirable leakage of magnetic flow to other components. Furthermore, a connecting cable 45 for the electromagnet 29 as well as a cable duct 46 for allowing a cable 45 to pass through a fixed housing 41 are provided.

The sleeve 35 is axially longer than the anchor element 34 and comprises an end face which is in contact with a sliding bush or sliding ring 37. The sliding ring 37, in turn, is indirectly axially supported relative to the second coupling part 26 via a transmitter element 38. The transmitter element 38 is provided in the form of an annular disc which, on its radial inside, comprises a plurality of circumferentially distributed, axially extending resilient engagement elements 39 which, by their ends, form-lockingly engages one or several resilient undercuts 40 of the second coupling part 26. At its radially outer end, the annular disc comprises a cylindrical portion 42. Between the housing 7 or rather the second housing part 9 and the transmitter element 38 there is arranged a returning spring 43 which, in the present embodiment, is provided in the form of a plate spring, however it is understood that it is also possible to use other types of springs such as helical springs.

FIG. 3 shows in detail the connecting region between the driving gear 6 and the first and second housing parts 8, 9. The driving gear 6 comprises a receiving portion 63 which forms a lateral introducing aperture for the first flange portion 10 and for the second flange portion 12. At its end opposed to the introducing aperture, there is provided a radially inwardly directed inner flange 64 which forms a lateral supporting face 65 for the first flange portion 10. The first flange portion 10 of the first housing part 8 is thus axially fixed between the supporting face 65 of the driving gear 6 and the second flange portion 12 of the second housing part 9. The second flange portion 12 is material-lockingly connected to the driving gear 6 via a weld 66. It can be seen that, of the group comprising the first flange portion 10 and the second flange portion 12, only the second flange portion 12 is welded to the driving gear 6, whereas the first flange portion 10 remains non-welded relative to the driving gear 6, respectively the second flange portion 12. Thus, the first flange portion 10 is indirectly connected to the driving gear 6 by being axially clamped in between the inner flange 64 of the driving gear 6 and the second flange portion 12 welded to the driving gear 6.

The receiving portion 63 comprises a cylindrical inner face, and the first and the second flange portion 10, 12 comprise corresponding cylindrical outer faces. The first flange portion 10 has a smaller axial width than the second flange portion 12. When the two flange portions 10, 12 have been inserted into the receiving portion 63, the outer side face 67 of the second flange portion 12 is positioned approximately in the same plane as the side face 73 of the driving gear 6, which laterally delimits the receiving portion 63. Because both flange portions 10, 12 are jointly received in the receiving portion 63 of the driving gear 6, only one single face at the receiving portion 63 has to be machined, which face forms the centering seat for the two flange portions 10, 12. In this way, it is possible to achieve good concentric running and axial runout conditions for the connecting assembly 2.

FIG. 3 shows furthermore that, in the joining region, the driving gear 6 and the second flange portion 12 comprise annular lips 68, 69. In the condition where the second flange portion 12 is inserted into the receiving portion 63, the annular lips 68, 69 comprise a small radial gap which is closed during the welding operation. On the radial inside of the annular lip 68, the second flange portion 12 comprises an annular lateral recess 70. Accordingly, the driving gear 6, on the radial outside of the annular lip 68, comprises a lateral annular recess 71. Between the annular lip 69 and the lateral recess 70 there is formed a face which widens towards the side face 67 and, more particularly, is conical in shape. Accordingly, the annular lip 68 of the driving gear 6 comprises, more particularly, a conical outer face which is tapered towards the side face 73.

Between the receiving portion 63 and the second flange portion 12, there is provided an annular inner recess 72 which is arranged axially between the side face 67, 73 and half the axial extension of the receiving portion 63. The inner recess 72 is formed by a first annular groove in the cylindrical inner face of the receiving portion 63 as well as by a second annular groove in the cylindrical outer face of the second flange portion 12, which first annular groove and second annular groove are positioned opposite one another. After the welding operation, the inner recess 72 delimits the root of the weld 66. It can be seen that the lateral annular recesses 70, 71 axially extend at least approximately as far as the inner recess 72.

The first and the second flange portion 10, 12 comprise an interference fit relative to the receiving portion 63, i.e. the two flange portions 10, 12 are pressed into the receiving portion 63 before the welding operation takes place. The radial force acting from the driving gear 6 on the outer face of the first flange portion 10 as a result of the press fit has been given the reference symbol Fr. After the welding operation has been carried out, the first flange portion 10 is axially fixed between the supporting face 65 of the driving gear 6 and the second flange portion 12. The interference fit may be dimensioned in such a way that the torque value at which the first and the second housing part 8,9 can be rotated relative to the driving gear 6 is smaller than 200 Nm, more particularly smaller than 175 Nm, and in one exemplary embodiment, preferably approximately 150 Nm. After completion of the welding operation, the torque required for rotating the first housing part 8 relative to the driving gear 6 is clearly increased due to the shrinkage forces occurring during cooling and due to the axial pretension generated in this way. This is achieved as a result of the design of the annular lips 68, 69 and of the recesses 70, 71, 72, which will be described in greater detail below.

During the welding process, the annular lips 68, 69 open slightly by the values w which, for the sake of clarity, are exaggerated considerably. The annular lips 68, 69 move outwardly approximately around the central rotation points P. Due to the rapid welding process, with a relatively small amount of energy being introduced into the region to be joined and a high cooling speed, cooling causes shrinkage which has been given the reference symbol c. The shrinkage movement c during cooling is greater than the expansion movement w occurring during the welding process. During the cooling process, the annular lips 68, 69 move towards each other around the central rotation points P, each by the amount c. As a result, there is generated an axial force Fa1 which acts on the second flange portion 12 towards the first flange portion 10. In this way, the first flange portion 10 is clamped in between the supporting face 65 and the second flange portion 12 by an axial force Fa2. As a result of said axial force which can also be referred to as a pretensioning force, the torque required for rotating the first housing part 8 relative to the second housing part 9 and the driving gear 6 respectively is greatly increased. There are thus generated high axial pretensioning forces, thus avoiding a relative movement between the first housing part 8 and the second housing part 9 and the driving gear 6 respectively, even without having to provide additional anti-rotation mechanisms.

The driving gear 6 preferably comprises case-hardening steel, for instance 20 MnCR5. These are steels with a relatively low carbon content of a maximum of 0.30%. To increase the hardness value, the steel is "inserted" into a carbon-containing atmosphere and heated. The first and the second housing part are preferably produced from a cast material, more particularly cast iron with spheroidal graphite, for example EN-GJS-500 (GGG50) or EN-GJS-600 (GGG60).

For producing the disclosed connecting assembly, first the differential drive 3 together with its components and the coupling 4 are inserted into the housing part 8. Before or after inserting the differential drive 3 and the coupling 4 into the first housing part 8, the latter is axially pressed into the driving gear 6. After the first housing part 8 has been pressed into the driving gear 6 and after the differential drive 3 and the coupling 4 have been inserted, the second housing part 9 is pressed into the driving gear 6. In the process, the second flange portion 12 is made to axially contact the first flange portion 10, with the first flange portion 10 being supported on the supporting face 65. Finally, the driving gear 6 with the housing part 9 is continuously welded in the region between the annular lips 68, 69.

Welding takes place in the axial direction between the inner face of the driving gear 6 and the outer face of the second flange portion 12 in the region of the annular lips 68, 69. For this purpose, the connecting assembly 2 and the welding device are rotated relative to one another. Welding the second housing part 9 to the driving gear 6 may be affected by a high-energy beam, more particularly a laser beam. The filler material for the weld 66 is preferably nickel wire.

Figure 4:
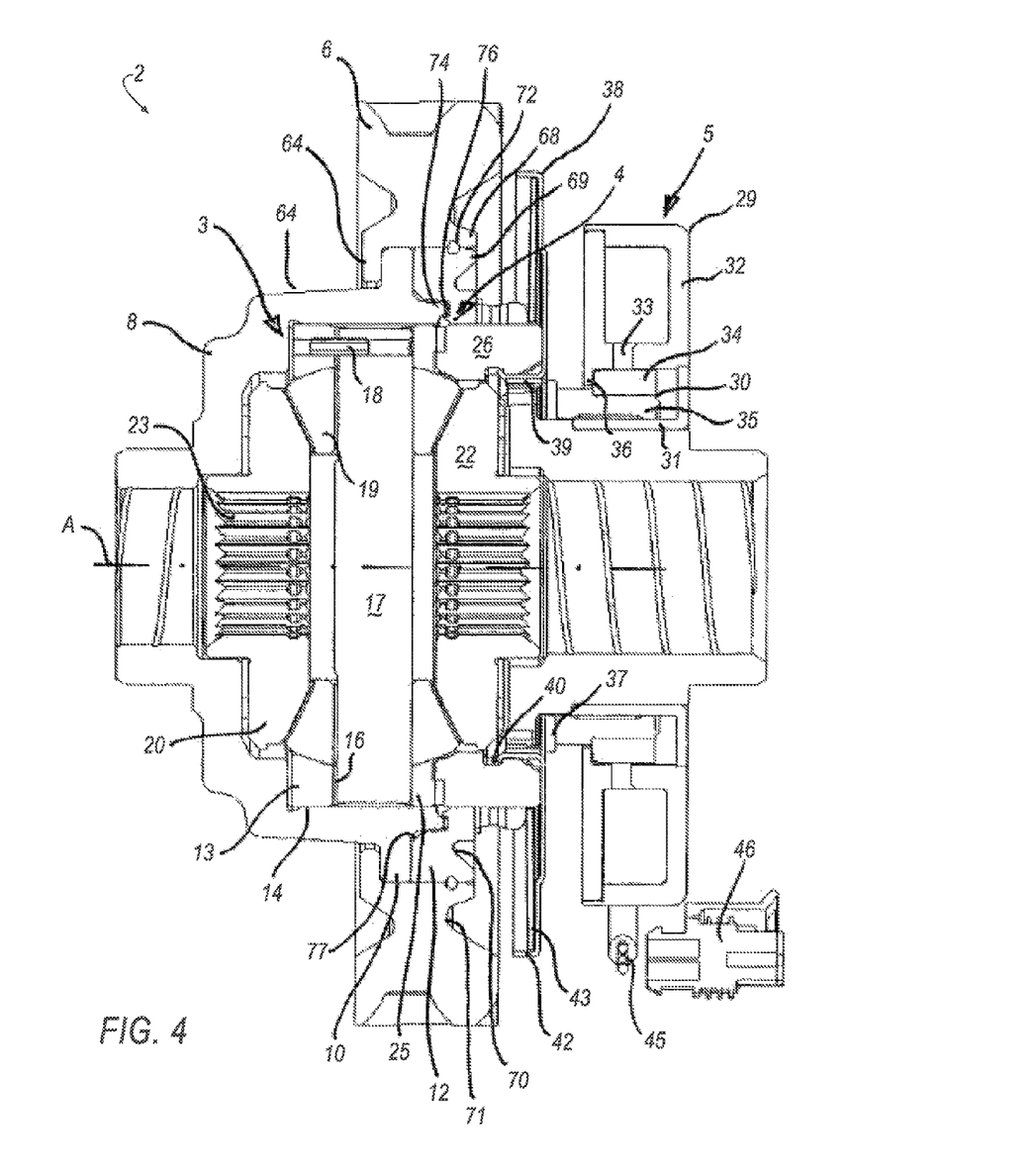
FIG. 4 is a longitudinal section if a connecting assembly in a second embodiment.
Figure 5:
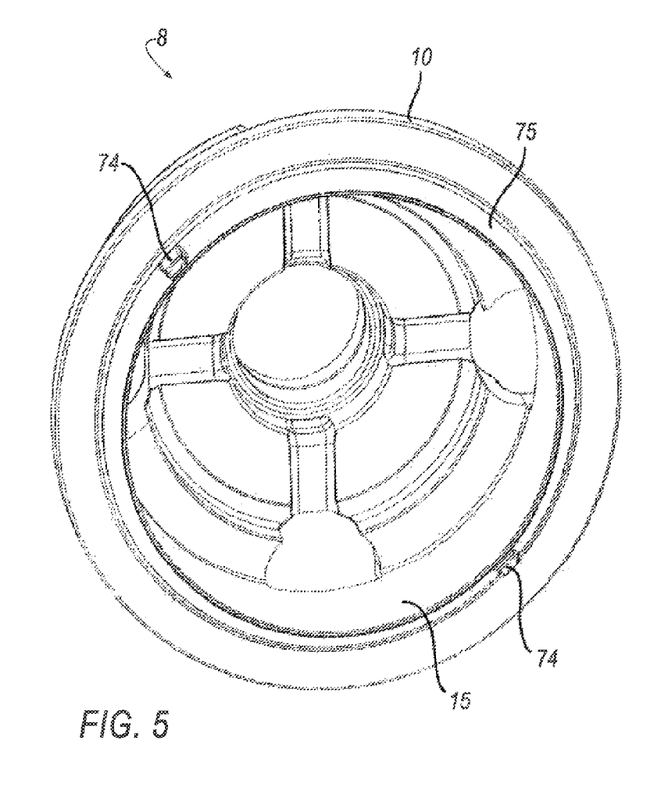
FIG. 5 is a perspective view of the first housing part of the connecting assembly according to FIG. 4.
Figure 6:
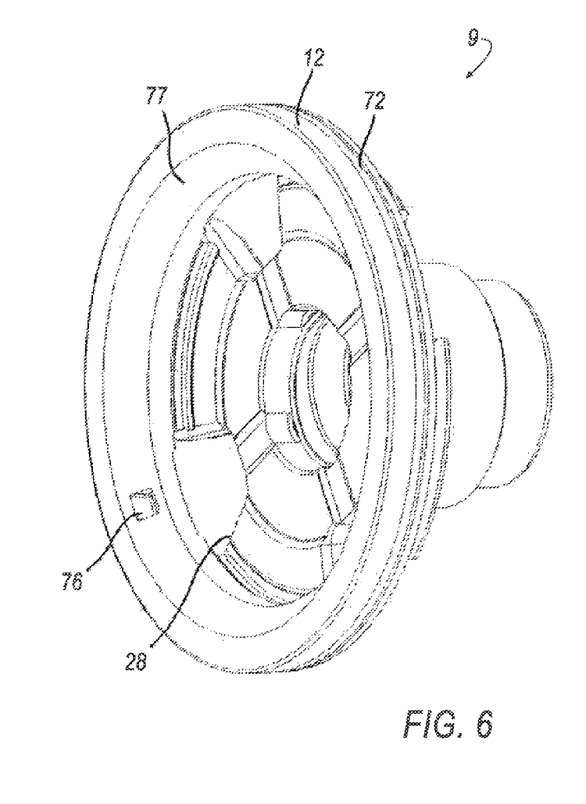
FIG. 6 is a perspective view of the second housing part of the connecting assembly according to FIG. 4.

FIGS. 4 to 6, which will be described jointly below, show a connecting assembly 2 in a second embodiment which largely corresponds to the embodiments according to FIGS. 1 to 3, so that, as far as their common features are concerned, reference is made to the above description. Identical and modified components have been the same reference numbers as those used in FIGS. 1 to 3. Below, basically there will follow a description of the differences.

A special characteristic of the current embodiment includes that, between the first housing part 8 and the second housing part 9, there are provided an anti-rotation mechanism, which prevents an undesirable rotation of the first housing part 8 relative to the driving gear 6 and the second housing part 9. Said anti-rotation mechanism comprises a plurality of circumferentially distributed projections 74 which are formed on to a sleeve portion 75 of the first housing part 8, as well as corresponding recesses 76 which are formed into the second housing part 9. It is understood that the provision of the projections and recesses at the first and second housing part 8, 9 could also be reversed. It is also understood that any number of projections 74 and recesses 76 may be employed, but at least it should be one of each. In the present embodiment, there are provided two anti-rotation elements around the circumference which are arranged so as to be diametrically opposed to one another. Furthermore, FIG. 6 shows an introducing cone 77 which allows the second housing part 9 to be easily introduced into, and centered on, the sleeve portion 75 of the first housing part 8. The recesses 76 are formed into the conical face. FIG. 4 shows the coupling 4 in a closed condition, i.e. the face teeth of the second coupling part 26 engage the counter teeth of the first coupling part 25.

Figure 7:
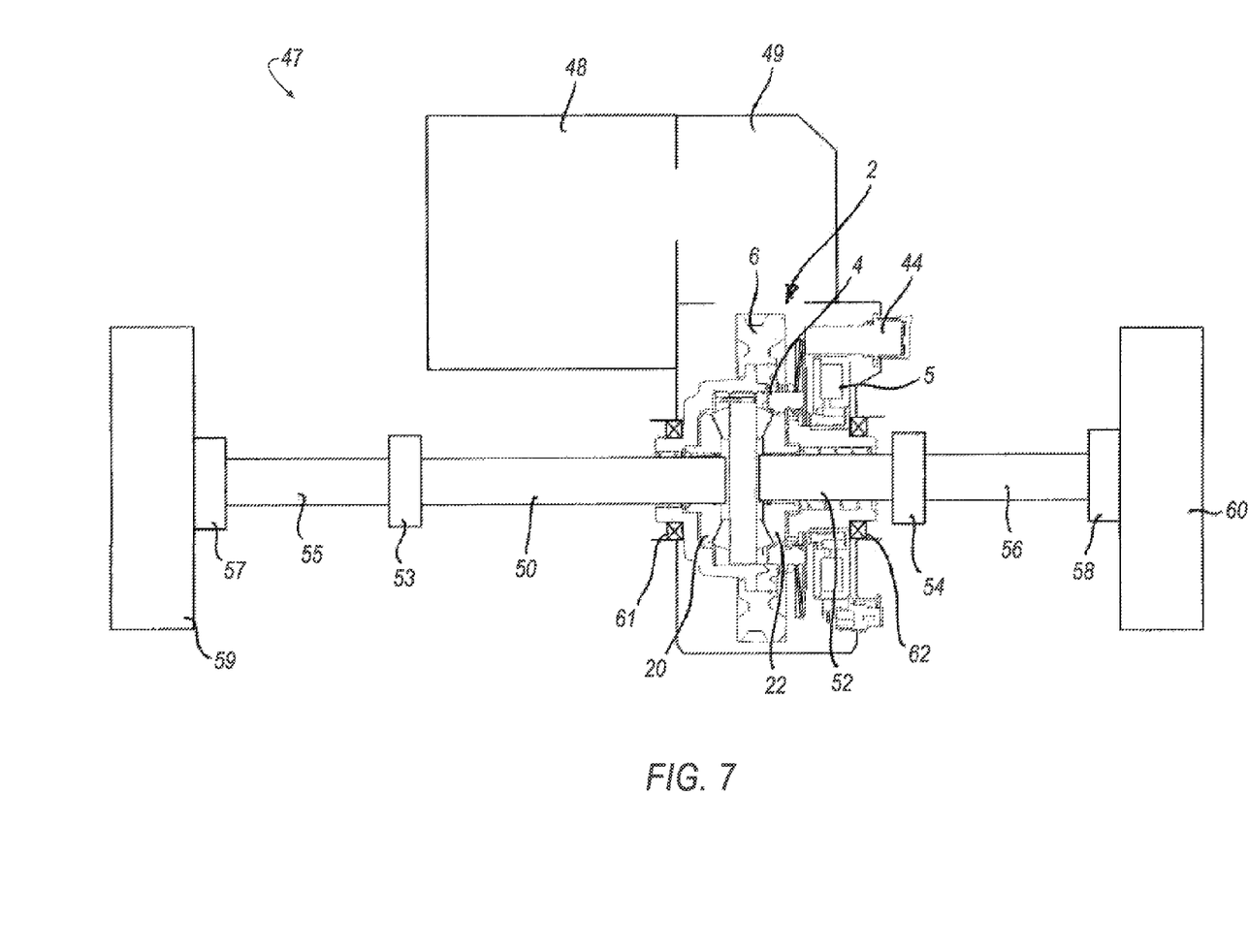
FIG. 7 is a diagrammatic view of a driving assembly having a connecting assembly according to FIG. 4.

FIG. 7 shows a driving assembly 47 with a connecting assembly 2 in accordance with FIGS. 4 to 6 in a diagrammatic illustration. The driving assembly 47 comprises an electric motor 48, which via a transmission stage 49, drives the connecting assembly 2 and the driving gear 6 of the connecting assembly 2. From the differential drive 3, the torque introduced when the coupling 4 is closed, is transmitted to the two sideshaft gears 20, 22. For torque transmitting purposes, corresponding sideshafts 50, 52 are inserted in a rotationally fixed way into the longitudinal teeth 23, respectively splines, of the sideshaft gears 20, 22. At the ends of the sideshafts 50, 52 there are provided constant velocity universal joints 53, 54 which, in turn, for torque transmitting purposes, via drive shafts 55, 56 and constant velocity joints 57, 57, are drivingly connected to wheels 59, 60 of the motor vehicle. Via bearings 61, 62, the connecting assembly 2 is supported relative to the stationary housing 41 so as to be rotatable around the axis of rotation A. Furthermore, it is possible to see a sensor 44 which records the position of the transmitter element 38 and transmits a corresponding sensor signal to the control unit for the electric motor.

Overall, the present disclosure is advantageous in that a secure connection is produced by welding between the torque transmitting components, i.e. between the driving gear 6 and the second housing part 9. On the other hand, only a force-locking or form-locking connection is produced between those components between which no torque is transmitted directly, i.e. the driving gear 6 and the first housing part 8. In the disclosed connecting assembly 2 the connection required for the transmission of torque, is thus restricted to those parts which actually participate in the transmission of torque. Overall, it is thus possible to reduce production and assembly effort.

The invention claimed is:

1. A connecting assembly, comprising:
  a housing which comprises a first housing part with a first flange portion and a second housing part with a second flange portion, wherein the first flange portion and the second flange portion each comprise a cylindrical outer face having a same outer diameter; and
  a driving gear which comprises a receiving portion with a cylindrical inner face, said receiving portion receiving the first flange portion of the first housing part and the second flange portion of the second housing part, the driving gear further comprising a supporting face which laterally delimits said receiving portion,
  wherein the first flange portion of the first housing part is axially arranged between the supporting face of the driving gear and the second flange portion of the second housing part,
  wherein, in a joining region between the driving gear and the second flange portion, a flange side face of the second flange portion, which flange side face faces away from the first flange portion, is flush with a driving gear side face of the driving gear, which driving gear side face laterally delimits the receiving portion, and
  wherein of the first and second flange portions only the second flange portion is welded to the driving gear wherein a weld is formed in the joining region between the driving gear and the second flange portion, wherein at least one of the driving gear and the second flange portion comprises an annular lip in said joining region, said annular lip configured such that the first flange portion is axially loaded by shrinkage forces generated by the weld in a cooled down condition.

2. The connecting assembly according to claim 1, wherein at least between the first flange portion of the first housing part and the receiving portion of the driving gear, there is formed an interference fit.

3. The connecting assembly according to claim 1, wherein both the driving gear and the second flange portion, each comprise an annular lip in the joining region.

4. The connecting assembly according to claim 1, wherein an anti-rotation mechanism is provided between the first housing part and at least one of the driving gear and the second housing part, which anti-rotation mechanism prevents the first housing part from rotating relative to the driving gear and the second housing part.

5. The connecting assembly according to claim 1, wherein the coupling comprises a first coupling part which is firmly connected to the differential carrier, and a second coupling part which is connected to the second housing part in a rotationally fixed way, wherein the second coupling part is held so as to be axially movable relative to the second housing part.

6. A connecting assembly, comprising,
  a housing which comprises a first housing part with a first flange portion and a second housing part with a second flange portion, and
  a driving gear which comprises a receiving portion for receiving the first flange portion and the second flange portion, the driving gear further comprising a supporting face which laterally delimits said receiving portion,
  wherein the first flange portion is axially arranged between the supporting face of the driving gear and the second flange portion,
  wherein, in the mounted condition, a flange side face of the second flange portion, which flange side face faces away from the first flange portion, is flush with a driving gear side face of the driving gear, which driving gear side face laterally delimits the receiving portion, and
  wherein of the first and second flange portions only the second flange portion is welded to the driving gear,
  wherein a differential carrier and a coupling are arranged in the housing, wherein the differential carrier is arranged so as to be rotatable around an axis of rotation in the housing and wherein, in a closed condition of the coupling, torque can be transmitted from the housing to the differential carrier and wherein, in an open condition of the coupling, a transmission of torque is interrupted, and
  wherein the coupling comprises a first coupling part which is firmly connected to the differential carrier, and a second coupling part which is connected to the second housing part in a rotationally fixed way, wherein the second coupling part is held so as to be axially movable relative to the second housing part.

7. A method of producing a connecting assembly with the following stages:
  producing a driving gear with a receiving portion and a lateral supporting face;
  providing a first housing part with a first flange portion;
  providing a second housing part with a second flange portion;
  inserting the first housing part into the receiving portion of the driving gear such that the first flange portion of the first housing part abuts the lateral supporting face;
  inserting the second housing part into the receiving portion of the driving gear such that the second flange portion of the second housing part is made to axially contact the first flange portion of the first housing part,
  wherein, in a joining region between the second flange portion and the driving gear, a flange side face of the second flange portion, which flange side face faces away from the first flange portion, is flush with a driving gear side face of the driving gear, and wherein at least one of the driving gear and the second housing part comprises an annular lip in the joining region; and
  of the first and second housing parts welding only the second housing part to the driving gear, thereby forming a weld between the second housing part and the driving gear, wherein the annular lip generates shrinkage forces towards the first flange portion when the weld is cooling down.

8. The method according to claim 7, wherein both the driving gear and the second housing part each comprise an annular lip which generate shrinkage forces towards the first flange portion when the weld is cooling down.

9. The method according to claim 7, wherein at least the first housing part, by means of the first flange portion, is pressed into the receiving portion of the driving gear.

10. The method according to claim 7, wherein welding the second housing part to the driving gear is effected by a high-energy beam.

11. The method according to claim 10, wherein welding is effected by a laser beam or an electron beam.

12. The method according to claim 7, wherein there is provided an annular recess which laterally delimits the annular lip.

\* \* \* \* \*